T. A. Kelley.
Car Brake.
Nº 71,391.  Patented Nov. 26, 1867.
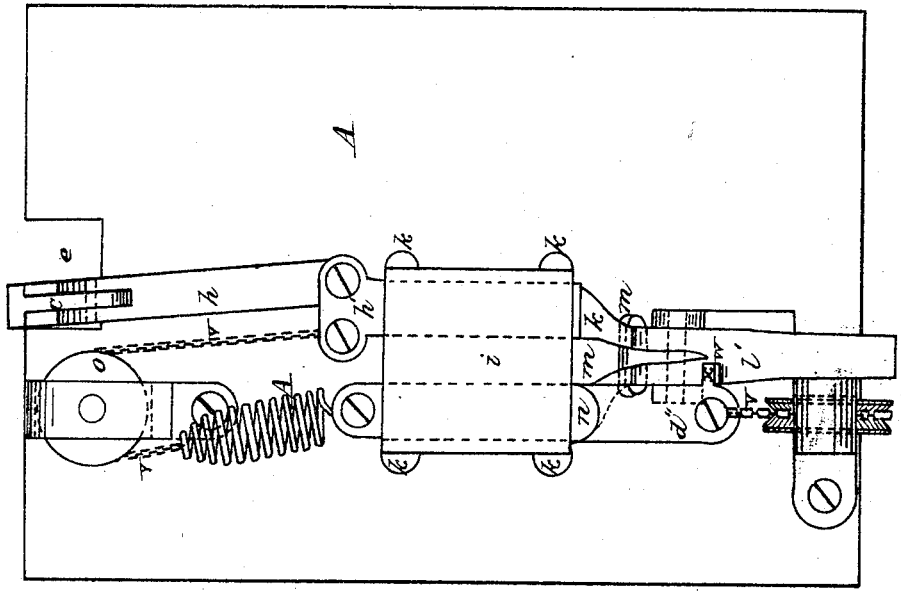
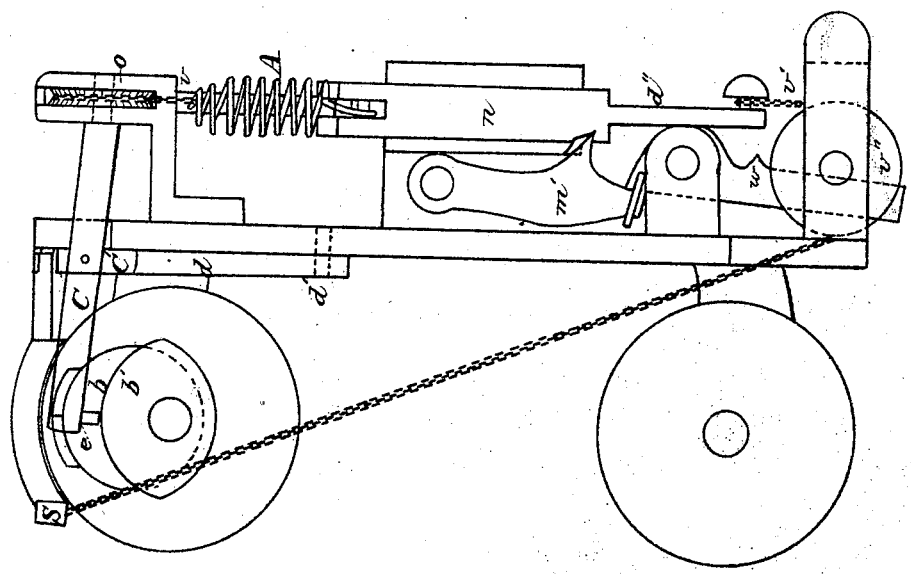
Witnesses
A. B. Crupper
F. C. Porter
Inventor
Thomas A. Kelley by
Browne Bradle attys

United States Patent Office.

THOMAS A. KELLEY, OF CLEVELAND, OHIO, ASSIGNOR TO HIMSELF AND WILLIAM G. WILSON, OF SAME PLACE.

Letters Patent No. 71,391, dated November 26, 1867.

IMPROVED CAR-BRAKE.

*The Schedule referred to in these Letters Patent and making part of the same.*

TO ALL WHOM IT MAY CONCERN:

Be it known that I, THOMAS A. KELLEY, of Cleveland, in the county of Cuyahoga, and State of Ohio, have invented a new and improved Car-Brake; and I do hereby declare that the following is a full and exact description thereof, reference being had to the accompanying drawings, and to the letters of reference marked thereon.

This invention belongs to that class in which the brakes are applied and taken off through the action of a spring. Its chief peculiarity consists in a mechanism for resetting the brakes automatically as soon as they are taken off, and for holding them during any length of time in readiness to be instantaneously applied.

To enable others to make and use my invention, I will now proceed to describe its construction and operation.

$a$ represents a car-body of ordinary construction, with the brake-mechanism placed upon its upper side. $b$ represents an eccentric, placed on one of the car-axles; and $b'$ represents a cam placed on the eccentric. $c$ represents a lever operating in a vertical plane, its pivot being in the lugs $c'$ on the head of the bar $d$, which is pivoted at $d'$. The lugs $c'$, with the lever, are thus allowed a limited lateral motion in the recess $e$ in the end of the car-floor. The width of this recess is about the same as the combined widths of the eccentric and cam. Upon the inner side of the lever $c$, near its lower end, is a pin, $e'$, which, upon occasion, comes in contact with the surface of the cam. One side of the cam is cut away in V-form, leaving a shoulder of that shape. Upon that side of the eccentric opposite the V-shaped shoulder of the cam, is a V-shaped projection, the point of which is about flush with the inner side of the eccentric. The ends of the shoulder on the cam are flush with the inner side of the eccentric. The consequence is, that when the pin $e'$ comes in contact with the cam, it is carried by the shoulder thereon to the eccentric, and by the shoulder on the eccentric it is carried clear of the latter, and falls off the inner side thereof. The method of effecting these movements and their object will now be explained. $h$ represents a horizontal bar, pivoted to the upper end of the lever $c$. The bar $h$ is pivoted at its other end to the head of the slide $h'$, which plays in an orifice of the block $i$, supported by the standards $k$, about at the centre of the car-bottom. To an ear projecting downward from the under side of said block is pivoted a dog, $k'$, provided with a tooth, $l$, which fits in a corresponding notch in the slide $h'$. The dog $k'$, growing gradually smaller, projects far enough beyond the rear end of the block $i$ to come within the range of action of the forked lever $l'$, pivoted in suitable supports near the rear end of the car. This lever is provided with a bail, $m$, projecting downward from its forked end, and enclosing the rear end of the dog $k'$, and also the rear end of the similar dog $m'$. The function of the bail $m$ is to prevent the ends of the dogs from dropping when they are not engaged with the slides. The dog $m'$ is pivoted like the dog $k$ beneath a slide, $n$, in another orifice in the block $i$, and also is provided with a tooth, which fits in a corresponding notch in the slide $n$. The slide $n$, at its front end, is connected with the tempered spiral spring A, which furnishes the power by which the brakes are let on and taken off. The spring A is attached at its forward end to one extremity of the chain $r$, which, passing around the horizontal sheave $o$, runs back and is also fastened to the forward end of the slide $h'$ by the side of the connecting-rod $h$. From the rear end of the slide $n$ projects a bar, $d''$, to the rear end of which is attached one extremity of a chain, $r'$, which, passing over the vertical sheave $r''$, runs under the car-floor, directly to the brake-beam $s$, at the other end of the car.

The operation of this mechanism is as follows: Suppose the pin $e'$ to have come in contact with either the eccentric $b$ or the cam $b'$ during the movement of the car. If the pin comes in contact with any part of the cam, it will speedily be carried by the V-shaped shoulder thereon to the face of the eccentric, and by the V-shaped projection thereon, the pin will very shortly be conducted off the side of the eccentric. During these operations the lower end of the lever $c$ will have been pushed outward by the action of the cam and eccentric. The upper end of the lever $c$ will consequently have been pushed inward, carrying with it the connecting-bar $h$ and the slide $h'$ far enough to cause the notch in the under side of the latter to pass some little distance beyond the tooth $l$ of the dog $k'$. As soon as the pin $e'$ passes off the side of the eccentric $b$, the force propelling this mechanism of lever, connecting-rod, and slide to the rear, of course ceases, and another force immediately acts in the contrary direction, drawing it toward the front again, until the tooth $l$ of the dog $k'$ catches in the notch in the slide $h'$, and arrests the said motion. The pin $e'$ is now held entirely clear of the eccentric and cam, and thus opposes no hindrance to the free rotation of the axle. It is obvious that during the time of the backward motion of the slide $h'$, the spring A must have been extended through the action of the chain $n'$. The extension of the spring draws upon the slide $n$, and would inevitably force it forward, thus applying the brakes through the operation of the chain $r$, were it not for the tooth of the dog $m'$, which catches in the notch of the slide $n$, and the prevents the application of the brakes. The extension of the spring A ceases the moment the pin $e'$ passes clear of the eccentric, and it is its retractile force that draws the slide $h'$ against the tooth $l$ of the dog $k'$. When this is done, the brakes are set and ready to be applied. In this condition the mechanism is capable of remaining for any length of time.

From what has been said, it is manifest that all that keeps the brakes off the wheels is the tooth of the dog $m'$, against which the slide $n$ is drawn by the spring A. To apply the brakes, then, it is only necessary to release the slide $n$ from the tooth of the dog $m'$. This is done by raising the rear end of the forked lever $l'$, which movement brings its front end upon the dog $m'$, and forces it downward, effecting the release. Immediately thereupon the spring A is retracted, and applies the brake through the operation of the slide $n$, the sheave $r''$, and the chain $r'$. It will be seen that, in this way, the brakes are applied instantaneously, and with a force dependent upon the strength of the spring A.

While the brakes are in contact with the wheels, the spring A is held under tension in one direction—forward—by the tooth $l$ and slide $h'$. It is also held under tension in the opposite direction by the wheels and brakes. To relieve it of these tensions, and thus let off the brakes, it is only necessary to withdraw the tooth $l$ from the slide $h'$, which is done also through the operation of the forked lever $l'$. As it is important that the dog $k'$, which acts in letting off the brakes, shall not be operated at the same time as the dog $m'$, which acts in letting them on, as would be liable to be the case, since the ends of both dogs are depressed by the different forks of the same lever, $l'$, a notch is cut at the rear end of the dog $k'$, which receives one fork while the other is actuating the dog $m'$, thus preventing the brakes from being let off at the same time they are let on. In order to prevent the former operation from taking place immediately after the latter, through accident or excitement, in continuing to elevate the rear end of the lever $l'$, a stop, $x$, is placed upon the bar $d'$, and a stop, $w$, on the lever $l'$. The stop $x$ is to prevent the elevation of the lever $l'$ after the spring A is freed, and the stop $w$ is to prevent the spring from drawing the bar $d''$, with its stop, so far forward as to render it at once inoperative to check the lever $l'$. Accordingly the letting on of the brakes is accomplished by two distinct movements of the lever $l'$—one upward, by which the spring A is freed, and the stop $x$ drawn against the stop $w$; the other downward, by which the stop $w$ is withdrawn from the stop $x$, and the letting-on process completed. Then the mechanism is ready for the letting-off process, which is accomplished, as has been explained, by a single upward movement of the lever $l'$. As soon as this movement is made, the pin $e'$ comes in contact with the cam $b'$, and the brakes are at once set again.

The design is to connect the lever $l'$ of each car with a cord running the whole length of the train, so that the proper person can let on and off all the brakes of the train instantaneously.

Having thus fully described my invention, what I claim as new, and desire to secure by Letters Patent, is—

1. The brake-setting mechanism, consisting of the cam $b'$, with its V-shaped shoulder, the eccentric $b$, with its V-shaped projection, both upon the axle of the car, the lever $c$, connecting-bar $h$, slide $h'$, with its notch, dog $k'$, with its tooth, chain $r'$, and spring A, in combination, substantially as described.

2. The letting-off mechanism, consisting of the lever $l$, with its bail $m$, dog $k'$, with its tooth, the slide $h'$, with its notch, the chain $r'$, and the tempered spring A, substantially as described.

T. A. KELLEY.

Witnesses:
W. G. WILSON,
W. H. HENDERSON.